No. 673,196. Patented Apr. 30, 1901.
J. B. CLINE.
MIXING APPARATUS.
(Application filed July 12, 1900.)
(No Model.)

Witnesses
F. S. Elmore
A. M. E. Kennedy.

Inventor
J. B. Cline
B. P. Dodge
Attorney

UNITED STATES PATENT OFFICE.

JOHN B. CLINE, OF JEFFERSON, IOWA, ASSIGNOR OF ONE-HALF TO D. L. HOWARD, OF SAME PLACE.

MIXING APPARATUS.

SPECIFICATION forming part of Letters Patent No. 673,196, dated April 30, 1901.

Application filed July 12, 1900. Serial No. 23,351. (No model.)

*To all whom it may concern:*

Be it known that I, JOHN B. CLINE, of Jefferson, county of Greene, and State of Iowa, have invented a new and useful Improvement in Mixing Apparatus, of which the following is a specification.

The object of this invention is to produce a device by means of which various substances in finely-divided, pulverized, or granular form may be rapidly, thoroughly, and intimately mixed; and to this end the invention consists of a casing or vessel of peculiar form to receive the ingredients to be mixed and adapted for rotation, as will be more fully described hereinafter.

The device is designed more particularly for mixing drugs in the form of powders and the like; but it is applicable as well for mixing plasters, food, and analogous substances where the conditions require a thorough intermingling of different ingredients.

Figure 1:
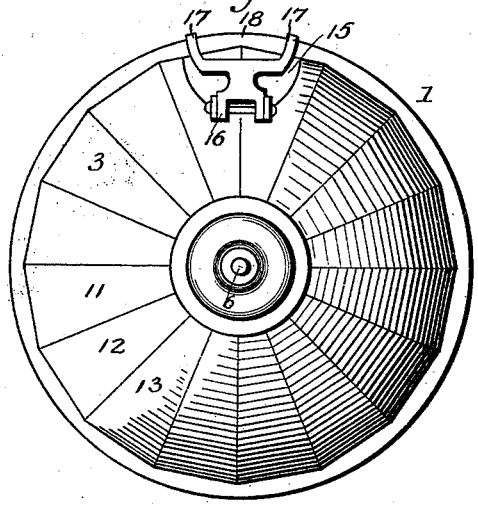
Figure 3:
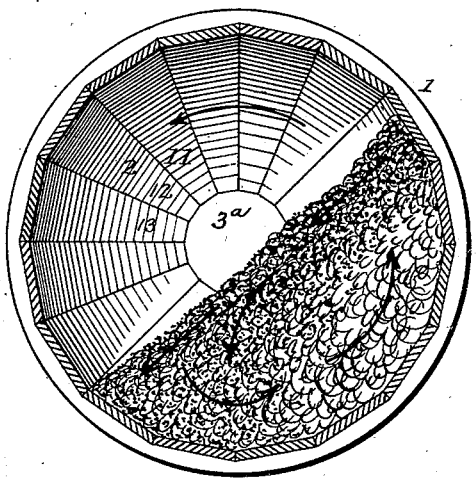
Figure 2:
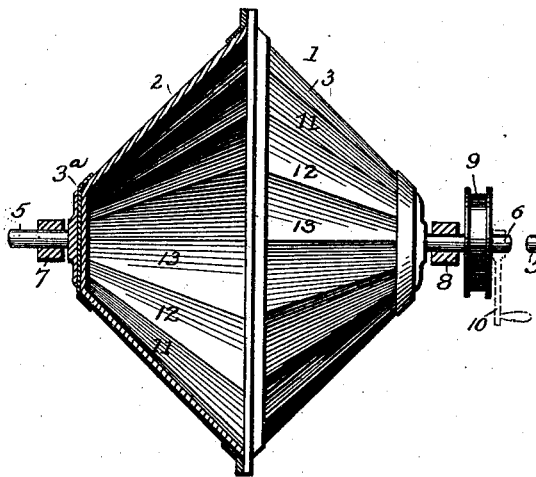
Figure 4:
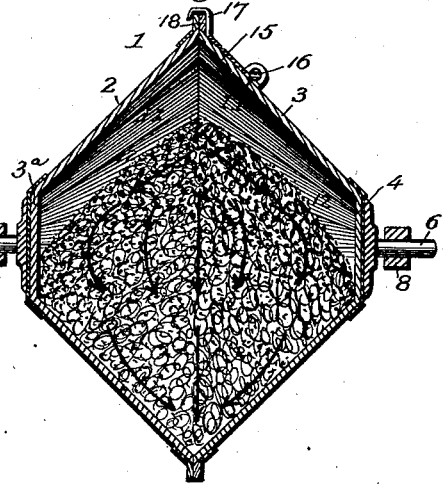

In the accompanying drawings, Figure 1 is a side elevation of my device. Fig. 2 is a front elevation of the same. Fig. 3 is a vertical longitudinal sectional elevation on the line $a\,a$ of Fig. 4, showing the position of the mass within the vessel when the latter is in operation. Fig. 4 is a vertical transverse sectional elevation on the line $b\,b$ of Fig. 1.

Referring to the drawings, my device comprises a hollow vessel or casing 1 of the general form of two cones placed base to base, the sides 2 and 3 of the casing having a sharp slope or inclination from the central widest portion to the ends $3^a$ and 4, so there will be tendency of the contents to gravitate toward the center. This casing is mounted in an appropriate manner to revolve on an axis extending centrally and horizontally through the same from end to end, and for this purpose it is provided at its ends with horizontal outwardly-extending spindles 5 and 6, mounted to revolve in bearings 7 and 8, one of the spindles being provided with a driving-pulley 9, adapted to be driven from a suitable source of power, or the spindle may be provided with a crank 10, as indicated by dotted lines in Fig. 2, to be turned by hand.

The interior sloping sides of the casing are made up of a series of flat smooth adjoining surfaces 11 12 13, &c., each of a different angle from the adjacent surface, and these surfaces are widest at the center of the casing, from which point they converge gradually to the ends, where they join vertical parallel walls constituting, respectively, the ends of the casing.

The substances to be mixed are introduced into the casing through an opening near the center closed by a door 15, hinged, as at 16, to the side and provided with a spring-finger 17, adapted when the door is closed to engage over a flange 18, projecting from the center of the casing.

In the operation of the device the casing is rotated in the direction of the arrow in Fig. 3 at such a speed as to maintain the mass in such position that its surface will extend at or about an angle of forty-five degrees, as represented in Fig. 3. The continued rotation of the casing will tend to lift the mass, the outer portions by reason of the sloping sides gravitating toward the center, as clearly indicated by arrows in Fig. 4, where they will displace the central portion of the mass, forcing the particles outward to the sides, whence they will return, as before, to the center. It is seen, therefore, that there is a general movement of the particles of the mass from the center outward in opposite directions and their return to the center of the casing. As a result of this action and the continually-changing angles of the surface of the casing supporting the mass the different ingredients are thoroughly mixed, each particle meeting every other particle, and their intimate mingling effected in a rapid and effective manner.

Having thus described my invention, what I claim is—

1. A mixing apparatus comprising a hollow casing having its sides sloping sharply toward its ends and of general conical form and mounted to revolve on a horizontal axis passing through the ends, said casing having the interior of its sides formed of a series of flat adjoining surfaces each of a different angle from the adjacent surface.

2. A mixing apparatus comprising a hollow casing having its sides sloping sharply toward its ends and of general conical form and mounted to revolve on a horizontal axis passing through the ends, said casing having the interior of its sides formed of a series of flat adjoining surfaces, each of a different angle from the adjacent surface and said surfaces converging from the center of the casing gradually toward its ends.

In testimony whereof I hereunto set my hand this 25th day of June, 1900, in the presence of two attesting witnesses.

JNO. B. CLINE.

Witnesses:
H. V. CLINE,
A. S. GILLILAND.